Patented July 27, 1926.

1,593,660

UNITED STATES PATENT OFFICE.

SIMON J. LUBOWSKY, OF JERSEY CITY, NEW JERSEY, ASSIGNOR TO METAL & THERMIT CORPORATION, OF CARTERET, NEW JERSEY, A CORPORATION OF NEW JERSEY.

PROCESS FOR REDUCING REFRACTORY ORES.

No Drawing.    Application filed April 12, 1924. Serial No. 706,134.

This invention relates to a process for the reduction of refractory ores and compounds such as the oxides of metals of the type of titanium, zirconium, uranium, etc. Alloys of the refractory metals such as titanium, zirconium, uranium, etc., containing less than 50% thereof with other metals such as iron have been made heretofore both in the electric furnace and by the well known so-called "thermit" reaction by the reduction of mixtures of compounds of the refractory metals and compounds of metals capable of alloying therewith, but attempts to produce the refractory metals in pure or reguline form by the thermit reaction have been unsuccessful. When it is attempted to produce these refractory metals by the use of a thermit mixture which does not contain a reducible compound of a metal capable of alloying therewith, it appears that the heat developed in the mixture is insufficient to produce the refractory metal in the form of a regulus. Following this theory that the heat of reaction in a simple thermit mixture is insufficient to produce the refractory metals in reguline form, it has been proposed to increase the heat of reaction of the mixture by the addition thereto of oxidizing agents, such as chlorates, nitrates, peroxides, etc., but the reports of other investigators which have been fully verified by my own researches show that this expedient does not offer a satisfactory solution to the problem.

I have now found that the refractory metals, titanium, zirconium, uranium, etc., may be produced in reguline form by the use of thermit mixtures containing a certain class of oxygen compounds exemplified by the sulphates, carbonates, and phosphates. A characteristic of this class of oxygen compounds which distinguishes its members from the oxygen compounds heretofore tried, that is, the nitrates, chlorates and peroxides, is that the oxygen content of the former is more strongly bound or combined and less reactive with the reducing element or elements of the thermit mixture than the oxygen content of the latter. Chlorates, nitrates, and peroxides as is well known are strong oxidizing agents, giving up their oxygen quite readily to reducing agents, whereas in the sulphates, phosphates and carbonates the oxygen content is more strongly bound and less readily given up to reducing agents.

In view of the failure attending the use of chlorates, nitrates and peroxides, the success attending the use of the carbonates, sulphates and phosphates is somewhat surprising. I wish, however, to offer the following theory for the purpose of explaining the difference in results. When a thermit mixture containing a reducing agent such as aluminum, a compound of a refractory metal such as titanium oxid, and an oxidizing agent such as sodium nitrate, is ignited, the reducing agent and the nitrate react very quickly, this reaction being largely completed before the desired reaction between the reducing agent and the refractory metal compound takes place. The total heat generated in the thermit mixture is thus distributed in point of time. On the other hand when the carbonates, phosphates and sulphates are used as the oxidizing agents, the rate of reaction between the reducing agent and the oxidizing agent more nearly approaches the rate of reaction between the reducing agent and the compound of the refractory metal so that the total heat of reaction of the mixture is properly concentrated in point of time. Therefore while the sulphates, phosphates, carbonates, etc., would not be expected to give as high a temperature as the more active oxidizing agents, the nitrates, chlorates and peroxides, they do apparently give a higher temperature when in association with compounds of the refractory metals in a thermit mixture.

My invention therefore resides mainly in the use in a thermit mixture containing a reducible compound of a refractory metal, of an oxidizing agent, the reaction rate of which with the reducing agent of the mixture approaches that of the refractory metal compound with the reducing agent.

For the production of the refractory metals in pure form, that is, unalloyed, it is of course necessary to use as the oxidizing agents the carbonates, phosphates, sulphates, etc. of metals which are not reduced to metallic state by the thermit reaction but remain as oxides and go into the slag.

The carbonates, sulphates, and phosphates of the alkali and alkaline earth metals including magnesium are suitable oxidizing agents for use in the production of the pure refractory metals. The use of compounds of the alkali and alkaline earth metals as the oxidizing agents possesses the further advantage that their reduction products readily combine with the oxidation products of the agents usually employed in thermit mixtures, aluminum, silicon, etc., and with the impurities commonly present in refractory metal ores such as silica and alumina, forming slags having desirable properties such as fluidity, workability and low melting point. It is of course within the scope of my invention to make alloys of the refractory metals by using as the oxidizing agent a carbonate, phosphate or sulphate of a metal capable of being reduced in the thermit mixture and alloying with the refractory metal or by simply adding to the thermit mixture the oxid or similar compound of the metal, for instance, iron to be alloyed with the refractory metal.

In fact the broad principle of the invention, that is, the use of an oxidizing agent or "booster" the reaction rate of which with the reducing agent bears such a relation to the reaction rate of the compound of the metal to be reduced with the reducing agent that the heats of the two reactions are added to each other to the best advantage, is applicable generally in the production of metals and alloys by the use of the thermit reaction, but, as is stated above, the invention has its most valuable application in the production of the refractory metals in unalloyed reguline form.

The invention is illustrated by the following specific example of a process in accordance therewith. About 100 parts by weight of titanium dioxid or rutile either finely ground or granular are mixed with about 30 parts by weight of calcium carbonate, for instance in the form of marble dust or whiting, and about 50 parts by weight of aluminum powder. To the resulting mixture lime or other fluxing agents may be added if desired. The mixture is preheated in the usual way and then ignited in a crucible, preferably by means of ignition powder, and permitted to react. More of the mixture may be added to the crucible while the reaction is under way in the well known way. At the end of the reaction the titanium will be found to be in the form of a regulus readily separable from the slag.

The relative quantities of the ingredients of the thermit mixture of course are variable. With respect to the use of fluxing agents and the quantity of reducing agent to be used my process does not differ from the prior art. As to the quantity of oxidizing agent, that is, the carbonates, sulphates, phosphates and the like to be used, it may be stated as a general rule that the quantity thereof in the thermit mixture should exceed 10% and may run as high as 50% or even higher.

The general character of the principal reactions which I believe take place in the process of my invention is indicated by the following reaction equations:

(a) Carbonates—
$3CaCO_3 + 4Al \rightarrow 3CaO + 2Al_2O_3 + 3C + heat.$
$3TiO_2 + 4Al \rightarrow 3Ti + 2Al_2O_3 + heat.$ (b) Sulphates—
$CaSO_4 + 2Al \rightarrow CaO + Al_2O_3 + s + heat.$
$3TiO_2 + 4Al \rightarrow 3Ti + 2Al_2O_3 + heat.$ (c) Phosphates—
$3Ca_3(PO_4)_2 + 10Al \rightarrow$
$\quad 9CaO + 5Al_2O_3 + 6P + heat.$
$3TiO_2 + 4Al \rightarrow 3Ti + 2Al_2O_3 + heat.$ In the foregoing reactions $CaCO_3$, $CaSO_4$ and $Ca_3(PO_4)_2$ are taken as representative of the alkali and alkaline earth and other metal compounds which may serve as oxidizing agents, $TiO_2$ is taken as representative of the metal compounds to be reduced and Al is taken as representative of the reducing agents. In each of the reactions illustrated, the base of the oxidizing agent, i. e., the CaO probably reacts with the $Al_2O_3$ or any other acid component of the mixture, for instance, $SiO_2$ forming aluminates such as $Ca_3Al_2O_6$ or silicates which go into the slag. The carbon liberated according to equation (a) may remain as such in the reaction mixture, although it is probable that it is at least partially oxidized and escapes from the reaction mixture as carbon monoxid. The sulfur of equation (b) and the phosphorus of equation (c) may be vaporized from the reaction mixture oxidizing as they escape to $SO_2$ and $P_2O_3$ or $P_2O_5$ respectively.

It is to be clearly understood that the foregoing reaction equations are merely theoretical explanations of the molecular and atomic mechanism of the process and that my invention does not depend upon the corrections thereof and is not limited to the instances given.

I claim:

1. The process of reducing metals from their compounds which comprises effecting a thermit reaction of a mixture comprising as components a compound of the metal to be reduced, a reducing agent, and an oxidizing agent the reaction rate of which with the reducing agent is of a similar order as the reaction rate of the compound of the metal to be reduced with the reducing agent.

2. The process as defined in claim 1 in which the oxidizing agent is one the reaction rate of which with the reducing agent is substantially slower than the reaction rate of nitrates, chlorates, peroxides and the like with the same reducing agent.

3. The process as defined in claim 1 in which the oxidizing agent is one of the compounds, carbonate, sulphate and phosphate.

4. The process of reducing compounds of the refractory metals, titanium, zirconium, uranium and the like which comprises effecting a thermit reaction of a mixture comprising as components the compound of the refractory metal to be reduced, a reducing agent, and an oxidizing agent which is less reactive with the reducing agent than nitrates, chlorates, peroxides and the like.

5. The process as defined in claim 4 in which the oxidizing agent is one of the compounds carbonate, phosphate and sulphate.

6. The process of producing the refractory metals, titanium, zirconium, uranium and the like in reguline form which comprises effecting a thermit reaction of a mixture containing a reducible compound of one of said refractory metals, a reducing agent and an oxygen containing salt of an alkali forming metal which is less reactive with said reducing agent than the corresponding nitrates, chlorates and peroxides.

7. The process as defined in claim 6 in which the oxygen containing salt of an alkali forming metal is one of the salts, carbonate, phosphate and sulphate.

8. The process of producing titanium in reguline form which comprises effecting a thermit reaction of a mixture of rutile, metallic aluminum and a carbonate of a metal of the left hand column of Group II of the periodic system.

In testimony whereof I affix my signature.

SIMON J. LUBOWSKY.